UNITED STATES PATENT OFFICE.

EDITH O'NEIL MACDONALD, OF ST. REGIS FALLS, NEW YORK.

DYE COMPOSITION.

1,222,433.  Specification of Letters Patent.  Patented Apr. 10, 1917.

No Drawing.  Application filed December 11, 1916. Serial No. 136,313.

*To all whom it may concern:*

Be it known that I, Mrs. EDITH O'NEIL MACDONALD, a citizen of the United States, and resident of St. Regis Falls, in the county of Franklin and State of New York, have invented and discovered a new and useful Dye-Composition, of which the following is a specification.

My invention relates to a dye composition, and it pertains more particularly to a dye obtained from hardwood leaves, such as maple leaves, by suitable methods of extraction.

I have found that when the autumnal colored leaves of certain hardwood trees such as maple are heated with water, a large proportion of coloring matter is extracted which is characterized by its valuable dyeing qualities.

The leaves most suitable for my purpose are those in which the natural change of color from green to red or brown has occurred. I consider it desirable to use leaves which have been exposed to frost, since the extracts from such leaves appear to have better dyeing qualities, perhaps due to a rupturing of the plant cells and oxidation of some of the constituents of the leaf.

As an illustration of the manner in which the extraction may be carried out, the following example is given:—

About a bushel (packed down) of fallen brown maple leaves is placed in an extraction vessel, such as an ordinary copper boiler, of about twelve gallons' capacity, and enough water (preferably soft water) is added to cover the leaves. The mixture is brought to boiling, and boiled for some time until the desired degree of extraction has been reached. The extract is then filtered off and concentrated, the concentration being continued, if desired, until a thick viscous liquid is obtained. Instead of boiling the same may be heated with water or steeped in a cold ammonia solution. The ammonia can then be driven off by any well known process.

The extract thus produced is of a dark brownish color, and may be made into a paste or mixed with suitable fillers. It produces on wool and silk, colors fast to light and washing. Wool is dyed a golden brown, while with white satin a brilliant gold is obtained. The dye obtained is non-poisonous and does not have a disagreeable odor.

Among the many advantages which derive from my invention, in addition to the valuable dyeing qualities of the product, there may be mentioned the low cost of production due to the simplicity of the process and the plentiful supply of raw material. This raw material is a perennial crop which can be used year after year without affecting the source of supply, whereas when wood or bark forms the raw material the source of supply in any one locality tends to become exhausted. The trees bearing leaves which are suitable in this connection, are indigenous to a vast expanse of territory comprising the hardwood belt of the United States and Canada, so that plants or factories for manufacturing the dye may be conveniently located and have a plentiful supply of leaves without incurring the expense which would result from transporting the raw material over long distances.

The residue obtained as a by-product may be used as a fertilizer, containing elements which are essential to plant growth. The by-product is also valuable in that the pulp or pomace may be used as a paper pulp.

While the above disclosure is what is now believed to be the preferred embodiment of my invention, I do not wish to limit myself to the steps as above outlined, but wish it understood that the invention is susceptible to various modifications that may fairly fall within the scope of the appended claims.

What I claim is:—

1. As a new product, a material containing a dye which dye is obtainable by extraction of the coloring matter from autumnal colored leaves of a hardwood tree, and which is substantially free from its naturally associated fibrous tissue.

2. As a new dye, a composition comprising the coloring matter substantially free from its naturally associated fibrous tissue, of the autumnal colored leaves of a hardwood tree, said coloring matter dyeing wool and silk shades having good fastness to light and washing.

3. As a new dye, a water extract of the coloring matter of the autumnal colored leaves of a hardwood tree, said coloring matter dyeing wool and silk shades having good fastness to light and washing.

4. As a new dye, a composition comprising the coloring matter, substantially free from its naturally associated fibrous tissue, of brown maple leaves, said coloring matter dyeing wool and silk generally brown shades having good fastness to light and washing.

5. As a new dye, a water extract of the coloring matter of brown maple leaves, said extract characterized by dyeing wool and silk brown shades having good fastness to light and washing.

(MRS.) EDITH O'NEIL MACDONALD.